US006584464B1

(12) United States Patent
Warthen

(10) Patent No.: US 6,584,464 B1
(45) Date of Patent: Jun. 24, 2003

(54) GRAMMAR TEMPLATE QUERY SYSTEM

(75) Inventor: David Warthen, Albany, CA (US)

(73) Assignee: Ask Jeeves, Inc., Berkeley, CA (US)

( * ) Notice: Subject to any disclaimer, the term of this patent is extended or adjusted under 35 U.S.C. 154(b) by 0 days.

(21) Appl. No.: 09/272,717

(22) Filed: Mar. 19, 1999

(51) Int. Cl.⁷ ............................................. G06F 17/30
(52) U.S. Cl. .................................. 707/4; 707/5; 707/10
(58) Field of Search ............................. 707/1–10, 100, 707/532; 704/79; 706/55, 934

(56) References Cited

U.S. PATENT DOCUMENTS

| | | | |
|---|---|---|---|
| 4,270,182 A | 5/1981 | Asija | 704/8 |
| 4,358,824 A | 11/1982 | Glickman et al. | 707/5 |
| 4,730,270 A | 3/1988 | Okajima et al. | 704/2 |
| 4,837,689 A | 6/1989 | Tanaka et al. | 704/8 |
| 4,839,853 A | 6/1989 | Deerwester et al. | 707/5 |

(List continued on next page.)

FOREIGN PATENT DOCUMENTS

| | | | |
|---|---|---|---|
| EP | 0196064 | | 3/1986 |
| WO | WO 99/66378 | | 12/1999 |
| WO | WO 00/57302 | * | 9/2000 |

OTHER PUBLICATIONS

Peter G. Annick, "Integrating Natural Language Processing and Information Retrieval in a Troubleshooting Help Desk", IEEE Expert, vol. 8, No. 6 pp. 9–17 (Dec., 1993).

Anon., "SQL Statement Library List", IBM Technical Disclosure Bulletin, vol. 36, No. 1, pp. 82–83 (Jan., 1993).

Jakobovits et al., "Implementing Multi–level Queries in a Database Environment for Vision Research", SPIE, vol. 2420, pp. 95–103 (1995).

Christopher Wisdo, "Position Paper", AAAI Fall Symposium—AI Applications in Knowledge Navigation and Retrieval, p. 154 (1995).

Swanson, D.R. "Word Correlation and Automatic Indexing Progress Report No. 2." Submission to the Council on Library Resources by Ramo–Wooldridge; Dec. 21, 1959.

Swanson, D.R. "Word Correlation and Automatic Indexing, Phase 1 Final Report: An Experiment in Automatic Text Searching." Submission to the Council on Library Resources by Ramo–Wooldridge; Apr. 30, 1960.

Swanson, D.R.. "Searching Natural Language Text by Computer Machine Indexing and Text Searching Offers an Approach to the Basic Problems of Library Automation." *Science* 132 (1960): 1099–1104.

(List continued on next page.)

*Primary Examiner*—Hosain T. Alam
*Assistant Examiner*—Anh Ly
(74) *Attorney, Agent, or Firm*—Townsend, Townsend & Crew LLP

(57) ABSTRACT

An information server directs users of the information server to desired sources of information where the desired sources of information are determined, at least in part, based on user input. The information server includes a query input processor, a question processor and an answer processor. The query input processor is used for accepting an initial user query. The question processor processes the initial user query to identify a set of possible well-formed questions selected from the question database, where a well-formed question is a question in the database that is coupled to at least one answer reference. The answer reference is typically either an answer or a pointer to a possible location of an answer. In a specific embodiment, the information server is coupled to the Internet so that users can pose questions using a Web browser from any Internet-connected device. In some systems, the question processor includes a tokenizer for tokenizing the initial user query into a list of words, a parser for generating a syntactic structure from the list of words, a normalizer for reducing the syntactic structure to a canonical syntactic structure, and a matcher for matching the canonical syntactic structure against a semantic network to obtain a weighted list of well-formed questions representative of possible semantic meanings for the initial user query.

9 Claims, 10 Drawing Sheets

U.S. PATENT DOCUMENTS

| | | | |
|---|---|---|---|
| 4,931,926 A | 6/1990 | Tanaka et al. ................. | 704/8 |
| 4,931,935 A | 6/1990 | Ohira et al. .................... | 704/8 |
| 5,067,070 A | 11/1991 | Miyao et al. ............... | 707/540 |
| 5,115,390 A | 5/1992 | Fukuda et al. ................ | 700/17 |
| 5,123,103 A | 6/1992 | Ohtaki et al. ................... | 707/5 |
| 5,140,522 A | 8/1992 | Ito et al. ......................... | 704/2 |
| 5,148,541 A | 9/1992 | Lee et al. ....................... | 707/2 |
| 5,161,225 A | 11/1992 | Abraham et al. .............. | 707/2 |
| 5,197,005 A | 3/1993 | Shwartz et al. ................ | 707/2 |
| 5,259,766 A | 11/1993 | Sack et al. .................. | 434/362 |
| 5,261,100 A | 11/1993 | Fujinami et al. ............ | 717/122 |
| 5,265,065 A | 11/1993 | Turtle ............................ | 707/4 |
| 5,268,839 A | 12/1993 | Kaji .............................. | 704/3 |
| 5,297,039 A | 3/1994 | Kanaegami et al. ........... | 707/5 |
| 5,338,976 A | 8/1994 | Anwyl et al. .................. | 704/2 |
| 5,369,575 A | 11/1994 | Lamberti et al. .............. | 704/9 |
| 5,383,392 A | 1/1995 | Kowalewski et al. ....... | 101/183 |
| 5,384,894 A | 1/1995 | Vassiliadis et al. ........... | 706/52 |
| 5,404,295 A | 4/1995 | Katz et al. ..................... | 707/2 |
| 5,418,948 A | 5/1995 | Turtle ............................ | 707/4 |
| 5,442,780 A | 8/1995 | Takanashi et al. ............. | 707/1 |
| 5,454,106 A | 9/1995 | Burns et al. .................... | 707/4 |
| 5,457,794 A | 10/1995 | Azumatani et al. ............ | 707/2 |
| 5,519,608 A * | 5/1996 | Kupiec .......................... | 707/3 |
| 5,523,945 A | 6/1996 | Satoh et al. .................... | 704/9 |
| 5,542,090 A | 7/1996 | Henderson et al. ............ | 707/2 |
| 5,715,444 A * | 2/1998 | Danish et al. ................. | 707/4 |
| 5,802,493 A * | 9/1998 | Sheflott et al. ................ | 705/1 |
| 5,819,265 A * | 10/1998 | Ravin et al. .................... | 707/5 |
| 5,836,771 A | 11/1998 | Ho et al. ..................... | 434/362 |
| 5,870,737 A | 2/1999 | Dockter et al. ................ | 707/4 |
| 5,878,423 A * | 3/1999 | Anderson et al. ........... | 707/100 |
| 5,893,219 A * | 4/1999 | Danish et al. .................. | 707/3 |
| 6,081,774 A * | 2/2000 | de Hita et al. .................. | 707/3 |
| 6,076,088 A * | 6/2000 | Paik et al. ...................... | 707/5 |
| 6,289,513 B1 * | 9/2000 | Bentwich ....................... | 707/6 |
| 6,182,068 B1 * | 1/2001 | Culliss .......................... | 707/5 |

OTHER PUBLICATIONS

Bobrow, D.G. "Natural Language Input for a Computer Problem Solving System." Ph.D. diss., Massachusetts Institute of Technology, 1964. NTIS: ADA015689.

Salton, G. "Information Storage and Retrieval" Scientific Report No. ISR–11 to The National Science Foundation, Jun. 1966.

Rubinoff et al. "Easy English, a Language for Information Retrieval Through a Remote Typewriter Console." University of Pennsylvania, Moore School of Electrical Engineering, Apr. 1967. NTIS: AD660081.

Green, C.G. and B. Raphael. "Research on Intelligent Question–Answering Systems." SRI Project 6001, Scientific Report 1. Stanford Research Institute, Menlo Park, CA, May 1967, NTIS: AD656789.

Stogniy, A.A. and V.N. Afanassiev. "Some Design Problems for Automatic Fact Information Retrieval and Storage Systems." In *Mechanized Information Storage Retrieval and Dissemination,* 289–299. New York: North–Holland, 1968.

Vallee, J.F. et al. "Retrieval Formulae for Inquiry Systems." *Inform. Stor. Retr.* 4 (1968): 13–26.

Schank, R.C. "The Use of Conceptual Relations in Content Analysis and Data Base Storage." Tracor Inc., Austin, TX, Jan. 1968. NTIS: AD666992.

Raphael, B. "Research on Intelligent Question–Answering Systems." SRI Project 6001, Final Report. Stanford Research Institute, Menlo Park, CA, May 1968. NTIS: AD671970.

Kellogg, C. "On–Line Translation of Natural Language Questions into Artificial Language Queries." *Inf. Stor. Retr.* 4 (Aug. 1968): 287–307.

Treu, S. "The Browser's Retrieval Game" *American Documentation* (Oct. 1968): 404–410.

Wilde, D.U. "Computer–Aided Strategy Design Using Adaptive and Associate Techniques." American Society for Information Science (ASIS) Annual Meeting, Columbus, Ohio. *Information Transfer* 5 (Oct. 1968):175–178.

Berul, L. "Document Retrieval." Chapter 7 in *Annual Review of Information Science and Technology,* vol. 4 (American Society for Information Science), 204–227. Chicago: Encyclopaedia Britannica Inc., 1969.

Merta, A. "INDORES 4—A Mechanized System of Information Retrieval in the Field of Information Science," 103–106. Hamden, CT: Archon Books, The Shoestring Press, 1970.

Winston, P.H. "Learning Structural Descriptions from Examples." Ph.D. diss., Massachusetts Institute of Technology, 1971.

Cleverdon, C. "Process in Documentation." *Journal of Documentation,* 26 (1): 55–67 (1970).

Spencer, D.A. "A study of the Description Matching Problem." Master's Thesis, Massachusetts Institute of Technology, 1971.

Corbett, L. "Controlled versus Natural Language: A Report on the Great Debate." *The Information Scientist* (United Kingdom): 115–120 (Sep. 1971).

Moreau, M. et al. "Recherché Bibliographiques en Language Naturel." *Automatisme* 16 (Dec. 1971): 628–637.

Winograd, T. "Five Lectures on Artificial Intelligence." Report STAN CS 74–459. Stanford University, Department of Computer Science, Sep. 1974. NTIS: ADA000085.

Belzer, J. et al. "Regeneration of Information Rather than Information Retrieval 'Concept Creation Method'." Final Report on the Regeneration Project. University of Pittsburgh, 1974. NTIS: ADA003617.

Kitov, A.I. and V.V. Kostyuk. "Retrieval of Documents Recorded in Natural Language in Computer Storage." *Automatic Documentation and Mathematical Linguistics* 9 (4): 25–28 (1975).

McMaster et al. "Computer Acquisition of Natural Language: A Review and Prospectus." *Int. J. Man–Machine Studies* 8 (1976): 367–396.

Waltz, D.L. "Natural Language Access to a Large Data Base." *Computers and People* (Apr. 1976): 19–26.

Unknown. "Chat at the Highest Level." *Scientific American* 235 (4): 60, 64 (1976).

Zloof, M.M. "Query–by–Example: A Data Base Language." *IBM System Journal* 4 (1977): 324–343.

Brecht, W. "Anwendungsspezifische Einflußgrößen auf natürlichsprachliches Informationssystem—(Application Specific Aspects of a Natural Language Information System)." *Sprach und Datenverarbeiting: International Journal for Language Data Processing* 1 (2): 93–97 (1977).

Lehnert, W. "The Process of Question Answering." Research Report #88. Yale University, Department of Computer Science, May 1977. NTIS: ADA040559.

PHLIQA Project Group. "PHLIQA 1—A Question–Answering System for Data–Base Consultation in Natural English I." *Philips Technical Review,* 38(9): 230–239 (1978–79).

PHLIQA Project Group. "PHLIQA 1—A Question–Answering System for Data–Base Consultation in Natural English II." *Phillips Technical Review,* 38 (10): 269–284 (1978–79).

Schank, R.C. "Computer Understanding of Natural Language." *Behavior Research Methods & Instrumentation* 10 (2): 132–138 (1978).

Dilger, W. and G. Zifonun. "The Predicate Calculus–Language KS as a Query Language." In *Logic and Data Bases,* 377–408. New York: Plenum Press, 1978.

de Heer, T. "Een Sloridge Maar Toegeerijke Zoekstrategie Voor Computers" (A Loose But Indulgent Retrieval Strategy for Computers). The Hague: Institut TNO voor Wiskunde Informatieverwerking en Statistiek, Mar. 1978. NTIS: N8027211.

de Heer, T. "Experiments with Multi–Lingual Queries in a Multi–lingual Data Base." The Hague: Institut TNO voor Wiskunde Informatieverwerking en Statistiek, Jul. 1978. NTIS: N8023209.

Woods, W.A. "Semantics for a Question–Answering System." Ph.D. diss., Harvard University, Division of Engineering, 1979. New York: Garland Publishing, Inc., 1979.

Schank, R.C. and W. Lehnert. "Computer Understanding of Stories." In *Human and Artificial Intelligence,* ed. F. Klix, 135–139. New York: North Holland Publishing Co., 1979.

Winston, P. and R.H. Brown, eds. "Progress in Artificial Intelligence " 1978, vol. 1. Report to the U.S. Office of Naval Research. Massachusetts Institute of Technology, Artificial Intelligence Laboratory, 1979. NTIS: ADA068838.

Buneman, P.O. "The Multiple Path Problem in Database Schemata." Technical Report. University of Pennsylvania, Wharton School, Department of Decision Sciences, Jan. 1979. NTIS: ADA067147.

Schank, R.C. and J. Kolodner. "Retrieving Information from an Episodic Memory or Why Computers' Memories Should Be More Like People's." Research Report #159. Yale University, Department of Computer Science, Jan. 1979. NTIS: ADA071445.

Gardner, A. et al. "Natural Language Understanding." In *Handbook of Artificial Intelligence,* ed. A. Barr. and A. Feigenbaum. Stanford University, Department of Computer Science, Report No. STAN–CS–79–754, Jul. 1979. NTIS: ADA076873.

Wilensky, R. "Understanding Complex Situations." *Proceedings of the Sixth International Joint Conference of Artificial Intelligence,* Tokyo, 2: 954–959 (1979).

Niehoff, R. et al. "The Design and Evaluation of a Vocabulary Switching System for Use in Multi–Based Search Environments." Final Report to the National Science Foundation. Battelle Columbus Labs, Ohio, Feb. 1980. NTIS: PB80154479.

Berwick, R. "Learning Structural Descriptions of Grammar Rules from Examples." Master's Thesis, Massachusetts Institute of Technology, 1980.

Katz, B. "Three–Step Procedure for Language Generation." A.I. Memo No. 599. Massachusetts Institute of Technology, Artificial Intelligence Laboratory, Dec. 1980.

Schank, R.C. et al. "Conceptual Information Retrieval." Research Report #190. Yale University, Department of Computer Science, Dec. 1980. NTIS: ADA095372.

Cullingford, R.E. "Integrated Knowledge Sources for Computer 'Understanding' Tasks." IEEE publication: *Transactions on Systems, Man, and Cybernetics* SMC–11(1):52–60 (Jan. 1981).

Vjekoslav, P. "Neki Problem Jezicnog Komuniciranja S Bazama Podataka." (English abstract on page 285). *Informatologia Yugoslavica* 14 (3–4): 281–285 (Jun. 1982).

Tou, F. "RABBIT: An Intelligent Database Assistant." *Proceedings of the National Conference on Artificial Intelligence,* 314–318. American Association for Artificial Intelligence, Pittsburgh, PA 1982.

Katz, B. and P. Winston. "A Two–Way Natural Language Interface." In *Integrated Interactive Computing Systems,* ed. P.Degano and E. Sandewall, 279–293. New York: North Holland Publishing Co., Sep. 1982.

Koloder, J.L. "Indexing and Retrieval Strategies for Natural Language Fact Retrieval." *ACM Transactions on Database Systems,*8 (3): 434–464 (1983).

Adelsberger, H.H. "Prolog as a Simulation Language." *Proceedings of the Winter Simulation Conference 1984,* ed. S. Sheppard, 501–504 (1984) Publisher unknown: author affiliated with Texas A&M University, Department of Computer Science, College Station, TX.

Brenner, E.H. et al. "American Petroleum Institute's Machine–Aided Indexing and Searching Project" *Science Technology Libraries* 5 (1): 49–62 (1984).

Stevens, L. "Natural–Language and Voice–Recognition Systems." Chapter 3 in *Artificial Intelligence the Search for the Perfect Machine,* 21–39. New Jersey: Hayden Book Co., 1984.

Jones, T.I. "Automatic Search Term Variant Generation." *Journal of Documentation,* 40 (1): 50–66 (1984).

Chamis, A. "Online Database Search Strategies and Thesaural Relationship Models." Ph.D. diss., Case Western Reserve University, 1984.

Pao, Y.–H. and C.–S. Yang. "A Computer Intelligent System for Understanding Chinese Homonyms." *The First International Conference on Computers and Applications,* Beijing, (Jun. 1984): 841–847. The Computer Society Press (IEEE), Catalog No. 84CH2039–6.

Winston, P. "Language Understanding" Chapter 9 in *Artificial Intelligence,* 2nd Edition, 291–334. Reading, MA: Addison–Wesley Publishing Co., Jul. 1984.

Cullingford, R. and M. Passani. "Word–Meaning Selection in Multiprocess Language Understanding Programs." *Transactions on Pattern Analysis and Machine Intelligence* (IEEE), PAMI–6 (4): 493–509 (1984).

Mitkov, R. "The Sublanguage Approach: A Key to Realistic Natural Language Processing." *Proceedings of the Sixth International Conference on Artificial Intelligence: Methodology, Systems, Applications,* ed. P. Jorrand and V. Sgurev. New Jersey: World Scientific, 1984.

Harris, L. "Teaching Computers English Proves Easier Than Training People." *Mini–Micro Systems* 17(15): 163–172 (1984).

Giter, D.M. et al. "Rapid Processing of Symbolic Information in a High–Level Language." *Automatic Documentation and Mathematical Linguistics (Nauchno–Tekhnicheskaya Informatsiya, Seriya 2)* 19 (4): 73–75 (1985).

Sebrechts, M. and P.H. Gross. "Programming in Natural Language: A Descriptive Analysis." *Behavior Research Methods, Instruments and Computers* 17 (2) 268–274 (1985).

Jarke, M. and J. Krause. "New Empirical Results of User Studies with a Domain Independent Natural Language Query System."In *Artificial Intelligence: Methodology, Systems, Applications,* ed. W. Bibel and B. Petkoff, 149–191. North Holland: Elsevier Science Publishers, B.V., 1985.

Hendrix, G.G. and E.D. Sacerdoti. "Natural Language Processing: The Field in Perspective." Chap. 7 in *Applications in Artificial Intelligence,* ed. S.J. Andriole. USA: Petrocelli Books Inc., 1985, 149–191.

Winston, P. "The LISP Revolution LISP Is No Longer Limited to a Lucky Few." *Byte* (Apr. 1985): 209–217.

Mahugh, D. "Understanding Fourth–Generation Languages." *UNIX/World* 2 (6): 36–47 (1985).

Christopher, A. "Artificial Intelligence and Computer Graphics: A Relationship in Its Infancy." *Computer Graphics World* (Aug. 1985): 8–20.

Cheng, C. "Microcomputer–Based User Interface for Library Online Catalogue." Technical Report No. LLL–T–8–85, (Oct. 1985): 4–15. Language Learning Laboratory School of Humanities University of Illinois–Urbana, 1985.

Chamis, A. "The Usefulness of Switching Vocabularies for Online Databases." *Proceedings of the American Society for Information Sciences Annual Meeting,* Oct. 1985, ed. C.A. Parkhurst, 22: 311–314. New York: Knowledge Industry Publications, 1985.

Williamson, M. "Natural–Language Inquiry Systems Part 2."*PC Week* (Oct. 8, 1985): 41–42.

Snyers, D. and D. Thayse. "Artificial Intelligence Methods for Speech Understanding." Communications Technology Symposium, Munich, Apr. 1986, German Chapter of the IEEE. Berlin: VDE–Verlag GmbH, 1986, pp. 103–107.

Cullingford, R. "SAM (Script Applier Mechanism)." In *Readings in Natural Language Processing,* ed. Grosz et al., 627–649. (Los Altos, CA: Morgan Kaufman Publishers, Inc., 1986.

Lehnert, W.G. "A Conceptual Theory of Question Answering." In *Readings in Natural Language Processing,* ed. Grosz et al., 651–657. Los Altos, CA: Morgan Kaufman Publishers, Inc., 1986.

Michalski, R. and P. Winston. "Variable Precision Logic." *Artificial Intelligence* 29 (1986): 121–146.

Bates, M. et al. "The IRUS Transportable Natural Language Database Inferface." *Expert Database Systems,* ed. L. Kerschberg, 617–630, Menlo Park: Benjamin Cummings Publishing Co., Inc., 1986.

Johnson, M.C. "A Grammar–Based Technique for Genetic Search and Optimization." Ph.D. diss., The College of William and Mary, 1996.

Frame, C.E. "Personal Computer and Workstation Operating Systems Tutorial." Master's Thesis, Naval Postgraduate School, 1986. NTIS: ADA280132.

Nagao, M. "Artificial Intelligence and Communication." *PTC '86 Proceedings: Telecom—Asia, Americas, Pacific,* 142–146. Pacific Telecommunications Council, Jan. 1986.

Tomiski, E.A. and Klahr, M. "How Artificial Intelligence Has Developed." *Journal of Systems Management* (May 1986): 6–10.

Zaki, M. and R. Salama. "Linkage Versus Integration for Binding Database and Interactive Graphics Systems." *Inform. Systems* 12 (3): 271–280 (1987).

Bailey, D.L. "Similarity Networks as a Means of Indexing and Retrieving Descriptions." Bachelor's Thesis, Massachusetts Institute of Technology, Jun. 1986.

van Rijsbergen, C.J. "A New Theoretical Framework for Information Retrieval." *SIGIR Forum* (Proceedings of the 9th International SIGIR Conference in Research and Development in Information Retrieval) 21 (1–2, Fall–Winter 1986–87): 194–200.

Chase, Rosen and Wallace, Inc. "CASPIR Computer Aided Searching and Patent Image Retrieval Users Guide." Examiners Version, Sep. 1, 1996. Alexandra, VA: Chase, Rosen and Wallace, Inc., 1996.

Fagan, J.L. "The Effectiveness of a Nonsyntactic Approach to Automatic Phrase Indexing for Document Retrieval." *Journal of the American Society for Information Science* 40 (2): 115–132, (1986).

Tennant, H. "Menu–Based Natural Language." In *Encyclopedia of Artificial Intelligence,* vol. 1, ed. S.C. Shapiro et al., 594–597. New York: John Wiley & Sons, 1987.

Fox, E.A. "Testing the Applicability of Intelligent Methods for Information Retrieval." *Information Services & Use* (1987): 119–138.

Grosz, B.J. et al. "Team: An Experiment in the Design of Transportable Natural–Language Interfaces." *Artificial Intelligence* 32 (1987): 173–243.

Katz, B. and R. Brooks, Jr. "Understanding Natural Language for Spacecraft Sequencing." *Journal of the British Interplanetary Society,* 40 (1987): 451–460.

Teskey, F.N. "Enriched Knowledge Representations for Information Retrieval." *Proceedings of the Tenth Annual International ACMSIGIR on Research & Development in Information Retrieval,* New Orleans (Jun. 1987). 43a–43g. Association for Computing Machinery, ACM Press No. 089791–232–2/87/0006/0043a (1987).

Onorato, L. and R. Schvaneveldt. "Programmer–Nonprogrammer Differences in Specifying Procedures to People and Computers." *Journal of Systems and Software* 7 (1987): 357–369.

Humphrey, S.M. and N.E. Miller. "Knowledge–Based Indexing of the Medical Literature. The Indexing Aided Project." *Journal of the American Society for Information Science* 38 (3): 184–196 (1987).

Brajnik, G. et al. "User Modeling in Intelligent Information Retrieval." *Information Processing & Management* 23 (4): 305–320 (Feb. 1987).

Chiaramella, Y. and B. Defude. "A Prototype of an Intelligent System for Information Retrieval: IOTA." *Information Processing & Management* 23 (4) 285–3093 (1987).

Shwartz, P. "Natural Language Interfaces and Database Expert Systems." *Proceedings of the Annual Artificial Intelligence & Advanced Computer Technology Conference,* Long Beach, CA (Apr. 1987).

Scown, S.J. "Artificial Intelligence and Natural Language Systems—Part 2." *Computers and People (May–Jun.)*:16–22 (1987).

Fagan, J.L. "Experiments in Automatic Phrase Indexing for Document Retrieval: A Comparison of Syntactic and Non–Syntactic Methods." Abstract and selected pages from chapters 1, 3 and 4, Sep. 1987. Also enclosed, Ph.D. Thesis, entire text version, Cornell University, No. 87–868, Sep. 1987.

Gevarter, W. "Introduction to Artificial Intelligence—Someday, Machines Will Be Able to Learn Throughout Their Lifetime: Building Up the Knowledge Base Needed for Advance Reasoning." *Chemical Engineering Progress* (Sep. 1987): 21–37.

Strukhoff, R. "The User Interface: How Does Your Product Look and Feel?" *Electronic and Optical Publishing Review* 7(4): 170–174 (1987).

Florian, D. "SAFIR (Smart Assistant for Information Retrieval)—An Artificial Intelligence Impact on Information Retrieval." Proceedings of the 11th International Online Information Meeting. *Online Information 87* (Dec. 1987), pp. 423–429. Medford, NJ: Learned Information, 1987.

Hendrix, G.G. and B.A. Walters. "The Intelligent Assistant Technical Considerations Invovled in Designing Q and A's Natural Language Interface." *Byte* (Dec. 1987): 251–258.

Schmidhausler F.J. In German: "Von Eliza uber Alice zum Sachmittel–Artificial Intellegence. (From ELIZA, via ALICE to practical use)." *Hard and Soft* (Nov./Dec. 1988): 52–55.

Kipfer, B. and F. Kipfer. In German: "Kunstliche Intelligenz in der Praxis [4] (Artificial Intelligence—Practice Aspects 4)" *Mikro+Kleincomputer 88–6* (1988): 47–55.

Wade, S. et al. "A Comparison of Knowledge–Based and Statistically–Based Techniques for Reference Retrieval." *Online Review* 12 (2): 91–108 (1988).

Katz, B. "Using English for Indexing and Retrieving." Conference Paper. In *User–Oriented Content–Based Text and Image Handling*, 1:314–333. Paris: C.I.D., 1988.

Katz, B. and Levin. "Exploiting Lexical Regularities in Designing Natural Language Systems" (Mar. 1988):316–323.

Katz, B. and B. Levin. "Exploiting Lexical Regularities in Designing Natural Language Systems." Massachusetts Institute of Technology, Artificial Intelligence Laboratory, *A.I. Memo No. 1041* (Apr. 1988): 1–23.

Ford, N. "European Research Letter: Knowledge–Based Information Retrieval." *Journal of the American Society for Information Science* 42 (1):72–74 (1991).

Katz, B. "Using English for Indexing and Retrieving." A.I. Memo No. 1096, (Oct. 1988): 1–30. Massachusetts Institute of Technology, Artificial Intelligence Laboratory, 1988.

Salton, G. and M. Smith. "On the Application of Syntactic Methodologies in Automatic Text Analysis." Association for Computing Machinery, ACM Press, 137–150 (1989). ACM 0–89791–321–3/89/0006/0137.

Lancaster, F.W. et al. "Subject Analysis." *Annual Review of Information Science and Technology (ARIST)*, ed. M.E. Williams, 24: 35–85. Amsterdam: Elsevier Science Publishers B.V., 1989.

Calzolari, N. and E. Picchi, "Acquisition of Semantic Information from an On–Line Dictionary." (1989): 87–93. Obtained through The British Library Document Supply Centre, Boston Spa, Wetherby, West Yorkshire LS23 7BQ, UK.

Wu, X. et al. "KDA: A Knowledge–Based Database Assistant." *IEEE* (1989): 402–409. IEEE publication No. CH2695–5/89/0000/0402.

Shuman, B.A. "Expert Systems and the Future of Interactive Searching." Proceedings of *National Online Meeting* (May 1989): 405–411. Medford, NJ: Learned Information, 1989.

Lelu, A. "From Data Analysis to Neural Networks: New Prospects for Efficient Databases." *Journal of Information Science* 17 (1991): 1–12.

Katz, B. "Using English for Indexing and Retrieving." Chapter 6 in *Artificial Intelligence at MIT: Expanding Frontiers*, vol. 1, ed. P.H. Winston and S.A. Sheared, 135–163. Cambridge, MA: The MIT Press, 1990.

Rapp and Wettler In German with English summary (p. 27). "Simulation der Suchwortgenerierung im Information–Retrieval durch propagierung in einem konnektionistischen Wortnetz." Nachr. Dok. 41 (1990): 27–32.

Aoe J.–I. "A Compendium of Key Search References." *Sigir Forum* 24 (3):26–42, 1990.

Walker, A. "Expert Database Systems in Prolog." Chapter 4 in *Knowledge Systems and Prolog*, Second Edition, ed., Walker et al, 248–336. Reading, MA: Addison–Wesley, 1990.

Libby, E. DuRoss. "Anaphora in Natural Language Processing and Information Retrieval." *Information Processing & Management* 26 (1): 39–52 (1990).

Lirov, Y. and V. Lirov. "Online Search Plus Logic Programming Equals Subject Bibliography: An Expert Systems Approach to Bibliographic Processing." *Online Review* 14 (1): 3–12 (1990).

McAllister–Harper, D. "Dewey Decimal Classification in the Online Environment: A Study of Libraries in North Carolina." *Cataloging & Classification Quarterly* 11 (1): 45–58 (1990).

Molholt, P. "MARC and the Promise of Artificial Intelligence for Subject Access: Current Limitations and Future Considerations." in *Beyond the Book Extending MARC for Subject Access*, ed. T. Petersen, and P. Molholt, 247–257. Boston: G.K. Hall & Co., 1990).

Monroe, A.N. and K.D. Roe. "What's the Purpose? Functional Access to Archival Records." *Beyond the Book Extending MARC for Subject Access*, ed. T. Petersen, and P. Molholt, 157–170. Boston: G.K. Hall & Co., 1990).

Svenonius, E. "Bibliographical Control." In *Academic Librarians Research Perspectives*, ed. M.J. Lynch, ACRL Publications in Librarianship No. 47: 38–66. Chicago: American Library Association, 1990.

Sano, H. "Facet Tabulation of Index Terms." *Information Processing & Management* 26 (4): 543–248 (1990).

Reynolds, S.J. "Sabbatical: The Pause That Refreshes." *Journal of Academic Librarianship*, 16 (2): 90–93 (1990).

Comaromi, J.P. "Summation of Classification as an Enhancement of Intellectual Access to Information in an Online Environment." *Cataloging & Classification Quarterly* vol. 11(1) 99–102 (1990).

Line, M.B. "Bibliographic Records for Users: From Disordered Superabundance to Cost–Effective Satisfaction." *ASLIB Proceedings* 42 (2): 41–49 (1990).

Fuhr, N. In German with English summary (p. 3). "Zur ubervindung der Diskrepanz zwischen Retrievalforschung und—praxis." *Nachr. Dok,* 41 (1990): 3–7.

Whalen, T.E. and A.S. Patrick. "COMODA: A Conversation Model for Database Access." *Behavior & Information Technology* 9 (2): 93–110 (1990).

Hahn, U. "Topic Parsing: Accounting for Text Macro Structures in Full–Text Analysis." *Information Processing & Management* 26 (1): 135–170 (1990).

Salton, G. et al. "On Application of Syntactic Methodologies in Automatic Text Analysis." *Information Processing & Management* 26 (1): 73–92 (1990).

Berwick, R. and S. Fong. "Principle–Based Parsing: Natural Language Processing for the 1990s." Chapter 12 in *Artificial Intelligence at MIT: Expanding Frontiers,* ed. P.H. Winston and S.A. Shellard, 288–361. Cambridge, MA: The MIT Press, 1990.

Rowley, J.E. "A Comparison Between Free Language and Controlled Language Indexing and Searching." *Information Services & Use* 10 (1990): 147–155.

Black, B. "Computers and Everyday Language." *Computer Age* (Mar. 1990): 46–48.

Korycinski, C. and A.F. Newell. "Natural–Language Processing and Automatic Indexing." *The Indexer* 17 (1): 21–29 (1990).

Casadaban, C. "DEB: A Diagnostic Experience Browser Using Similarity Networks." Conference Paper, *Fifth Conference on Artificial Intelligence for Space Applications,* Huntsville, AL, May 1990: 517–524.

Kerner, J. and R.S. Freedman. "Developing Intelligent Tutoring Systems with A Hypermedia Object–Based Intelligent Educator (HOBIE)." *Proceedings: The Third International Conference on Industrial & Engineering Applications of Artificial Intelligence & Expert Systems* (Jul. 1990), 2: 890–897. ACM Publication No. ACM 089791–372–8/90/0007/0890.

Barnett, J. et al. "Knowledge and Natural Language Processing." *Communications of the ACM* 33 (8): 52–71 (Aug. 1990).

Haton, J.P. In French with English abstract (p. 198). "Introduction a l'intelligence artificielle et aux systemes experts." *Memoires et Etudes Scientifique Revue de Metallurgie* (Oct. 1990): 197–208.

Myers, A. et al. "The Facilitation of Problem–Based Learning in Medical Education Through a Computer–Mediated Tutorial Library." Fourteenth Annual Symposium on Computer Applications in Medical Care, Washington, D.C., Nov. 1990: 469–472. IEEE Computer Society Press, Publication No. 0195–4210/90/0000/4069, 1990.

Koschmann, T.D. et al. "Designing Communication Protocols for a Computer–Mediated Laboratory for Problem- -Based Learning" Fourteenth Annual Symposium on Computer Applications in Medical Care, Washington, D.C., Nov. 1990: 464–468. IEEE Computer Society Press, Publication No. 0195–4210/90/0000/0464, 1990.

Bergeron, B.P. et al. "A Generic Neural Network–Based Tutorial Supervisor for Computer Aided Instruction." *Fourteenth Annual Symposium on Computer Applications in Medical Care,* Washington, D.C. (Nov. 1990): 435–439 IEEE Computer Society Press, Publication No. 0195–4210/90/0000/0435.

Hancock–Beaulieu, M. "Evaluating the Impact of an Online Library Catalogue on Subject Searching Behaviour at the Catalogue and at the Shelves." *Journal of Documentation* 46 (4): 318–338 (1990).

Winston, P.H. and B.K.P. Horn. "Symbolic Pattern Matching," Chapter 24: 354–365. "Interpreting Transition Trees," Chapter 28: 412–430. "Compiling Transition Trees," Chapter 29: 432–439. "Procedures–Writing Programs and Database Interfaces," Chapter 30: pp. 442–454, in *LISP Third Edition,* ed. P.H. Winston and B.K.P. Horn. Reading, MA: Addison–Wesley Publishing Co., 1991.

Cha, S.K. "Kaleidoscope: A Cooperative Menu–Guided Query Interface (SQL Version)." *IEEE Transactions on Knowledge and Data Engineering,* 3 (1): 42–47 (1991).

Martin, M.M. "Subject Indexing in the New Ethnographic Bibliography of North America." *Behavioral & Social Sciences Librarian* 11 (1): 13–26 (1991).

Koutamanis, A. and V. Mitossi. "Design Information Retrieval." *Delft Progress Report,* 15 (1991/1992): 73–86.

Bell, J.E. and L.A. Rowe. "An Exploratory Study of AD Hoc Query Languages to Databases." *Eighth International Conference on Data Engineering,* Tempe, Arizona (Feb. 1992): 606–613. IEEE Computer Society Press, 1992. Publication No. 0–81686–2545–7/92.

Zijlstra, B.H.A. "Search Strategies in Natural Language: Bringing Down the Barriers to Information Transfer." *AGARD Conference Proceedings 505* (Oct. 1991): 4–1–4–39. Advisory Group for Aerospace Research and Development, AGARD Publication No. CP–505, 1991.

Germain, E. "Introducing Natural Language Processing." *A.I. Expert* 7 (8): 30 (1992).

Bliek, A. et al. "NLTIS: Objectives and Benefits." *Delft Progress Report* 15 (1991/1992): 291–297.

Bliek, A. et al. "Overview of the NLTIS." *Delft Progress Report* 15(1991/1992): 299–319.

Bliek, A. et al. "The Object and Entity Model Manager." *Delft Progress Report* 15 (1991/1992): 321–334.

Bliek, A et al. "The Dialogue Manager." *Delft Progress Report* vol. 15 (1991/1992): 335–336.

Bliek, A et al. "Expert Systems for Diagnosis." *Delft Progress Report* 15 (1991/1992): 337–350.

Smolen, A. et al. "Development of the Cardiovascular System: An Interactive Video Computer Program." *Proceedings from Sixteenth Annual Symposium on Computer Applications in Medical Care,* Baltimore, Maryland (Nov. 1992): 847–848. American Medical Informatics Association, AMIA Publication No. 0195–4210/92.

O'Brien, L. "It's Only Logical: The Combination of Declarative Procedural Programming Makes Prolog a Logical Choice." *Computer Language* 9 (12): 61 (1992).

Sheilla E. Desert. "Westlaw Is Natural v. Boolean Searching: A Performance Study." *Law Library Journal,* 85 (1993): 713.

Konig, A. "Data structure and computer program for fast interactive searches of clinical diagnoses." *Med. Inform.* 18 (1) 45–51 (1993).

Pritchard–Schoch, T. "Natural Language Comes of Age." Westlaw Online Information Service, Online 33 (May 1, 1993): 1–15. Westlaw No. 3280292.

Keisch, B. "Interactive Computer–Based Instruction: Basic Material Control and Accounting Demonstration." Brookhaven National Laboratory, Upton, NY, Aug. 1993. NTIS: DE93018669.

Paradaens, J. et al. "Toward a Theory of Spatial Database Queries" Association of Computing Machinery, 1994, pp. 279–288. ACM Publication No. 0–89791–639–5/94/0005.

Feldman, S.E. "Search Natural Language Systems: Searchers Know Thy Engine." *Searcher* (Oct. 1994): 34–38.

DuVal, R.W. "Rotorcraft Handling Qualities and Flight Control System Specification Personal Computer Tutorial Data Base." *Final Report,* (Feb. 1995): 1–32. Advanced Rotorcraft Technology, Inc., 1995, NTIS: ADA308217.

Yuret, D. "Discovery of Linguistic Relations Using Lexical Attraction." Ph. D. diss., Massachusetts Institute of Technology, 1998, pp. 1–56.

Katz, B. et al. "Philip: Integrating Web Resources and Lexicons into Natural Language Query Systems." *IEEE* (Sep. 1999): 255–261. IEEE Publication No. 0–7695–0253–9/99.

Vaccari, E. et al. "DARR: A Free–text Analysis System for the Automatic Documentation of Radiological Reports." *Meth. Inform. Med.* 16(3): 144–153 (1977).

Starr, B.H. et al. "HIKE (HPKB Integrated Knowledge Environment)—A Query Interface and Integrated Knowledge Environment of HPKB." *Intelligent Systems Demos: Proceedings of the Sixteenth National Conference on Artificial Intelligence,* 927–928. Menlo Park, CA: AAAI Press, 1999. Publication No. AAAI–99.

Katz et al. Pages from website re the START system including overview and rules; most pages by Boris Katz. http://www.ai.mit.edu/people/boris/webaccess/node1.html through /node10.html (Feb. 1997). Undated material from the MIT InfoLab Group http://www.ai.mit.edu/projects/infolab.

Dillon, M. and A.S. Gray. "FASIT: A Fully Automatic Syntactically Based Indexing System." *Journal of the American Society for Information Science.* 34 (2): 99–108 (1983).

Freedman. "Using a Text Planner to Model the Behavior of Human Tutors in an ITS." Printed on Oct. 12, 1999 from http://www.cs.indiana.edu/event/maics96/Proceedings/Freedman/freedman.html.

Jansen. "Using an Intelligent Agent to Enhance Search Engine Performance." Printed on Oct. 12, 1999 from http://www.firstmonday.dk/issues/ from vol. 2, No. 3, 1997.

Sneiders. "FAQ Answering on WWW using Shallow Language Understanding." Printed on Oct. 12, 1999 from http://ekd.dsv.su.se/ifip98/faq–answering.htm.

Whitehead. "List of Publications from the DBLP Bibliography Server." Printed on Oct. 12, 1999 from http://www.informatik.uni–trier.de/~ley/db/indices/a–tree/w/Whitehead-:Steven_D=.html.

Spoken Language Systems. "A Conventional System Architecture: Galaxy." (1998) Printed on Oct. 12, 1999) from http://www.sls.lcs.mit.edu/sls/whatwedo/architecture.html.

Katz. "START Natural Language Question Answering System" printed on Oct. 12, 1999 from http://www.ai.mit.edu/projects/infolab/start–system.html.

"Computer Networks and ISDN Systems." Printed from http://www.elsevier.com/inca/publications/store/6/0/0/0/7/9/600079.pub.htm.

* cited by examiner

Ask Jeeves - More Answers

Jeeves has 2 answers to the question: What is the weather forecast for the city of Seattle, WA?
Here they are with some brief descriptions.

"WeatherCo." Personal Weather Pages
5 day forecast from "WeatherCo.". 6-10 day forecast and hour-by-hour forecast also available for free, along with various other weather information. Pay subscriptions give you access to aviation info, etc.

American Weather Provider
Weather in American cities.

© 1996-1999 Ask Jeeves, Inc. All rights reserved.
Ask Jeeves is a Trademark of Ask Jeeves, Inc.

*FIG. 4*

GRAMMAR TEMPLATE QUERY SYSTEM

BACKGROUND OF THE INVENTION

The present invention relates to information query systems in general and to interactive query systems more particularly.

With the increasing popularity of the Internet, the global internetwork of networks, many services have come into being that seek to provide information for users of those services. One such service is the GOPHER service, wherein a user is presented with lists of information in the form of menus, and the user is provided with options to select a menu item, which might lead to another menu or to a document of interest, or to initiate a search with a particular set of keywords. The GOPHER system was primarily text based, with the underlying structure being directories on file servers, usually spanning many interlinked and independent servers.

With the advent of a more graphical interface, many such search services continue today, albeit with a graphical interface for use with a Web browser. Here, "Web" refers to the hyperlinked collection of dynamic and static hypertext pages available over the Internet using the HTTP (HyperText Transport Protocol) and commonly referred to as the "World Wide Web" or "WWW", and a Web browser is a client program which allows a user to navigate the Web.

A typical navigation involves setting up an initial query with a set of search terms and viewing the results. If the results are provided as a hypertext page, the user can then select a link on that hypertext page to view the results in more detail.

A disadvantage of searching using search terms is that the English language is imprecise without context and computers are not good at context. For example, asking a human librarian about "freedom and values in the Victorian era" might yield a book of essays on what the social mores were in the late nineteenth century in Europe and North America. However, performing a search with a search engine against a database of documents might result in the computer returning listings of real estate values for homes with Victorian architecture in Freedom, Calif.

Many providers of search services have attempted to automate the process of determining the proper context of a query so that the correct meaning is ascribed to each term. For example, a server might be programmed to note the ambiguity in the term "Victorian" and to further note that "era" refers to a time period and therefore, "Victorian" should be interpreted as the time period. Such processing is quite complex and often still fails to understand the context in which the user asks the question.

SUMMARY OF THE INVENTION

One embodiment of an information server according to the present invention directs users of the information server to desired sources of information where the desired sources of information are determined, at least in part, based on user input. The information server includes a query input processor, a question processor and an answer processor. The query input processor is used for accepting an initial user query. The question processor processes the initial user query to identify a set of possible well-formed questions selected from the question database, where a well-formed question is a question in the database that is coupled to at least one answer reference. The answer reference is typically either an answer or a pointer to a possible location of an answer.

In a specific embodiment, the information server is coupled to the Internet so that users can pose questions using a Web browser from any Internet-connected device. In some systems, the question processor includes a tokenizer for tokenizing the initial user query into a list of words, a parser for generating a syntactic structure from the list of words, a normalizer for reducing the syntactic structure to a canonical syntactic structure, and a matcher for matching the canonical syntactic structure against a semantic network to obtain a weighted list of well-formed questions representative of possible semantic meanings for the initial user query.

BRIEF DESCRIPTION OF THE DRAWINGS

FIG. 1 illustrates two variations of an information server according to the present invention;

FIG. 3 is an example of a question display page that might result from the processing of the question entry page shown in FIG. 2.

FIG. 4 is an illustration of one possible display for an additional answers page; FIG. 4 is an example of an additional answers page that might result from the processing of the question display page shown in FIG. 3.

DESCRIPTION OF THE SPECIFIC EMBODIMENTS

The following description describes some embodiments of the invention and these examples are not intended to limit the scope of the invention, which is defined by the attached claims. For example, the embodiments shown in the figure assume that the user asks questions of an information server via a Web browser over an Internet connection, but that need not be the case, as the user might access the information server over a network other than the Internet, or might access a local information server without an intervening network.

Figure 1A:
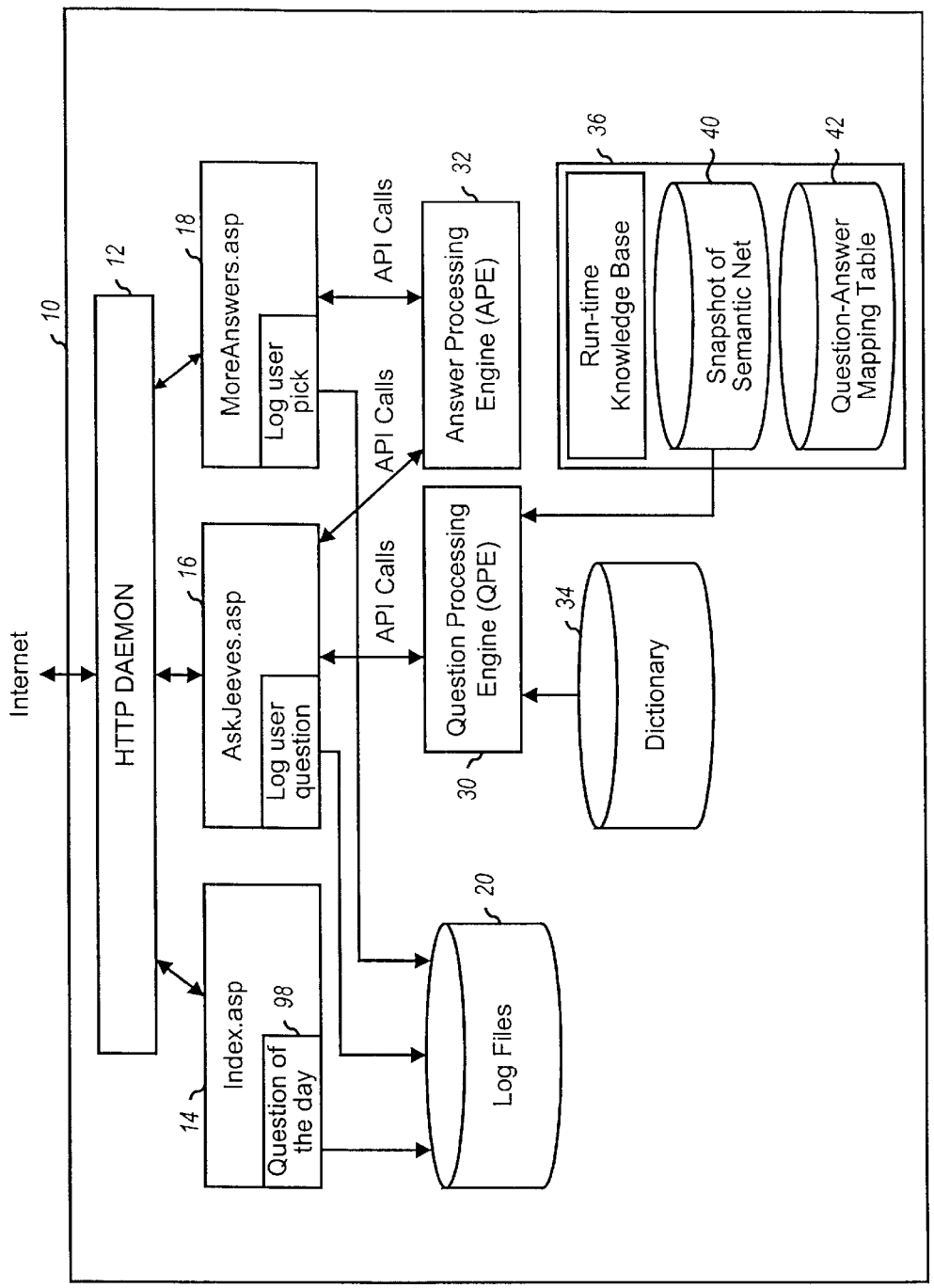
FIG. 1(a) is a block diagram of an HTTP server used to implement the information server and FIG. 1(b) is a block diagram of a generalized server user to implement the information server.

FIG. 1(a) is a block diagram of one embodiment of an information server 10 that is Internet-based. Information server 10 is an HTTP server, which responds to requests from HTTP clients such as Web browsers. The actual architecture of an Internet HTTP client-server link and HTTP client is not shown, but it should be understood that information server 10 operates on a computer that is designed and configured for Internet traffic, specifically TCP/IP packets encoding HTTP messages and it should be understood that any manner of client computer can be used to operate the Web browser. Since that technology is well-known and readily available, it need not be described further herein.

Information server 10 can either be a dedicated computer, a computing device specifically designed to implement the functions of an information server according to the methods described herein, or information server 10 can be in the form of one or more program code modules designed to run on a general purpose HTTP server as a process of that HTTP server. However implemented, information server 10 usually comprises the components shown in FIG. 1, such as an HTTP daemon 12 and a basic set of active HTML pages, including an opening page 14, a question page 16 and an additional answers page 18.

Opening page 14 comprises code and text for presenting the user at an HTTP client (such as a Web browser) with an introduction to information server 10. Question page 16 comprises code and text for presenting the user at the HTTP client with a question entry page (such as the page shown in FIG. 2) and a question display page (such as the page shown in FIG. 3). Additional answers page 18 comprises code and text for presenting the user at an HTTP client with additional answers to the questions shown in a question display page. The basic pages are Active Server Page (.asp) programs, but other programming languages could be used. Active Server Pages are one known technique for combining Visual Basic (VB) scripts and HTTP data structures and text. In addition to the basic set of pages, other pages might be provided to HTTP clients, depending on the navigation taken by the user through pages available from information server 10.

Figure 1B:
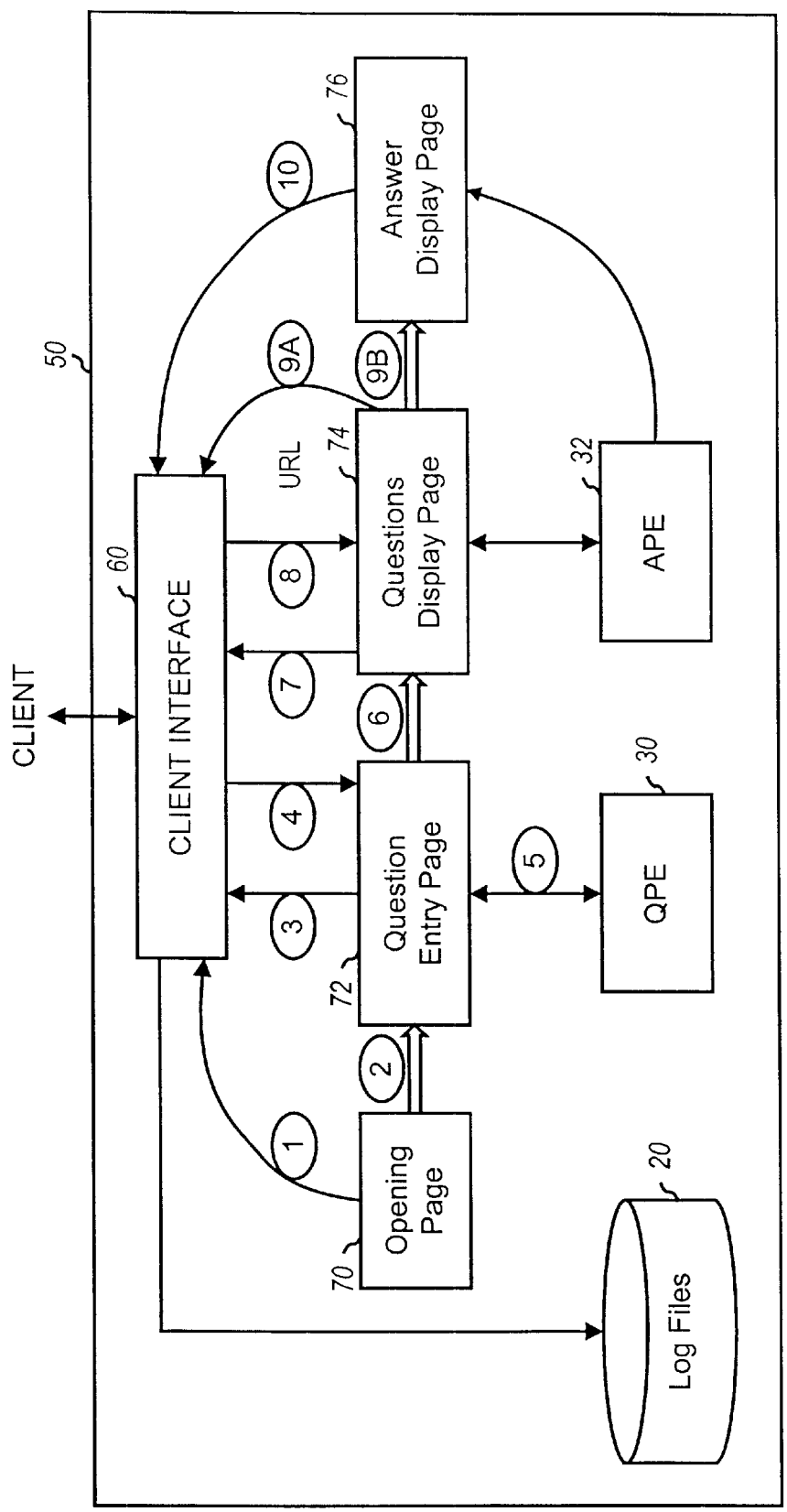

As shown in FIG. 1(*a*), actions taken by users in response to prompts on the basic set of pages are logged in log files 20. Also, as explained below, question page 16 receives questions and presents the questions entered by users to a question processing engine (QPE) 30. In this example, the communication with QPE 30 is via application programming interface (API) calls. As is well-known in the art of API design, the functionality of QPE 30, although shown separately, might be implemented as a set of calls from code in question page 16 to program code compiled into question page 16 (as might be the case with an API link library) with the communication between the two being in the form of function calls, or the program code for implementing QPE 30 could be a separately running process with the communication being in the form of interprocess messages.

Question page 16 receives the data needed to construct a question display page from QPE 30 and from an answer processing engine (APE) 32. Information server 10 also includes a dictionary 34 and a knowledge base 36, which comprises storage for a semantic net snapshot 40 and a question-answer mapping table 42. QPE 30 is coupled to dictionary 34 and semantic net snapshot 40 and uses the information obtained from those sources to generate template questions in response to a user-entered question. Template questions are questions that are mapped to answers in question-answer mapping table 42. Template questions usually, but not always, include parameters, such as the template question "What is the weather like in <city>?" where "<city>" is a parameter. APE 32 is coupled to knowledge base 36 to obtain information from semantic net snapshot 40 and question-answer mapping table 42.

FIG. 1(*b*) is a block diagram of a more generalized information server 50. Information server 50 can be implemented in a variety of client-server systems. For example, information server 50 might be built into a kiosk for providing answers to kiosk users' questions, or information server 50 might be connected to a corporate network for answering customer, supplier and/or employee questions. Information server 50 is shown comprising a client interface 60 for providing various pages (70, 72, 74, 76) to a client and interconnections between the various pages and QPE 30/APE 32.

The circled numbers in FIG. 1(*b*) indication one possible set of steps that might occur in a session with a user at a client. In step 1, client interface 60 sends an opening page 70 to the client and control is passed to a question entry page 72 (step 2). Client interface 60 presents the client with question entry page 72 (step 3) and receives the user's response (step 4). Information server 50 passes the response to QPE 30, which returns a set of template questions (step 5). Control passes to the code corresponding to a questions display page 74 (step 6), and information server 50 generates the questions display page for presentation to the user. Client interface 60 presents the questions display page to the user (step 7) and waits for the user to select a template question from the questions display page (step 8). The user selects a template question, if more than one is presented, and also selects any necessary parameters. Usually, the parameters will be directly related to the question asked, so the desired parameters might already be selected.

Once the user selects a template question, information server 50 uses AE to generate answers to the questions and either presents the user with one or more URL's of sites that answer the initial question (step 9A) and control passes to an answer display page (step 9B) that presents the user with the answer directly (step 10).

Figure 2:
FIG. 2 is an illustration of one possible display for a question entry page.

Referring now to FIG. 2, a typical question entry page 80 is shown. When a user is presented with question entry page 80, the user will then enter an initial user query, in an entry box 82, and press a button 84 to begin the process. The user can also view questions being posed by other users in window 86.

The initial user query can be a natural language question (e.g., "Where can I find information on the sport bicycling?") and may well include grammatical errors, or a set of keywords, such as "info sport bicycling", or a combination of a natural language question and keywords. Keywords might be "noun phrases" such as "King of Spain". When the user presses button 84, the initial user query is sent to information server 50 and client interface 60 passes the query to QPE 30. The query is logged to log files 20 for use in further refining information server 50, as described later in this description.

Typically, the query is in the form of a text string, but in some implementations, the query might be a text string combined with nontext data structures such as a collection of radio button (multiple choice) selections, switches and/or other pointers to selections. It should be understood that many different forms of queries are possible, so long as QPE 30 accepts the form in which the queries are presented. From the initial user query, QPE 30 processes the question to identify a set of template questions. Template questions are questions in a form that allows its context to be easily understood from the question, either because information server 50 has already answered the question to the liking of one or more users, or because an information analyst has input a question-answer template for that question. A question-answer template is a data structure that codes for one or more questions and includes pointers to answers to the coded question. This is explained in more detail in the description below of semantic nets and question-answer mappings (see, for example, FIG. 7). An example of a question answer template is:

Is it raining in <city>? ==> Pointer to weather page with parameter <city>

In that example, queries for the weather in many cities is compressed into one question template, with the parameter <city> being a placeholder for the city of interest. In the template, the answer to the question is a pointer to a weather page (such as a page on a weather Web site) with a parameter equal to the city of interest. Thus, using this question-answer template, information server 50 knows how to answer the question "Is it raining in Seattle?", namely by directing the user to a weather server that accepts a city parameter and passing the weather server "Seattle" as the parameter.

Figure 3:
FIG. 3 is an illustration of one possible display for a question display page.

Once QPE 30 identifies the set of template questions, those questions are presented to the user as questions display page 74 for selection. FIG. 3 shows an example display 90 resulting from such a questions display page. From that display 90, the user can select the desired template question and parameters, or can select a button 92 for more answers, resulting in a display such as that shown in FIG. 4.

An information server might also handle incidental displays, which are useful or interesting to users but are not necessarily required for the operation of the system. One example, a "question of the day" generator 98 is shown in FIG. 1(*a*). Generator 98 might select a question from asked questions to display in a question of the day area 88 on question entry page 80 (see FIG. 2). Other incidental displays might include a real-time question ticker 86 that puts up a random sampling of the questions currently being asked, a display of popular questions in specific categories and the like.

Figure 5:
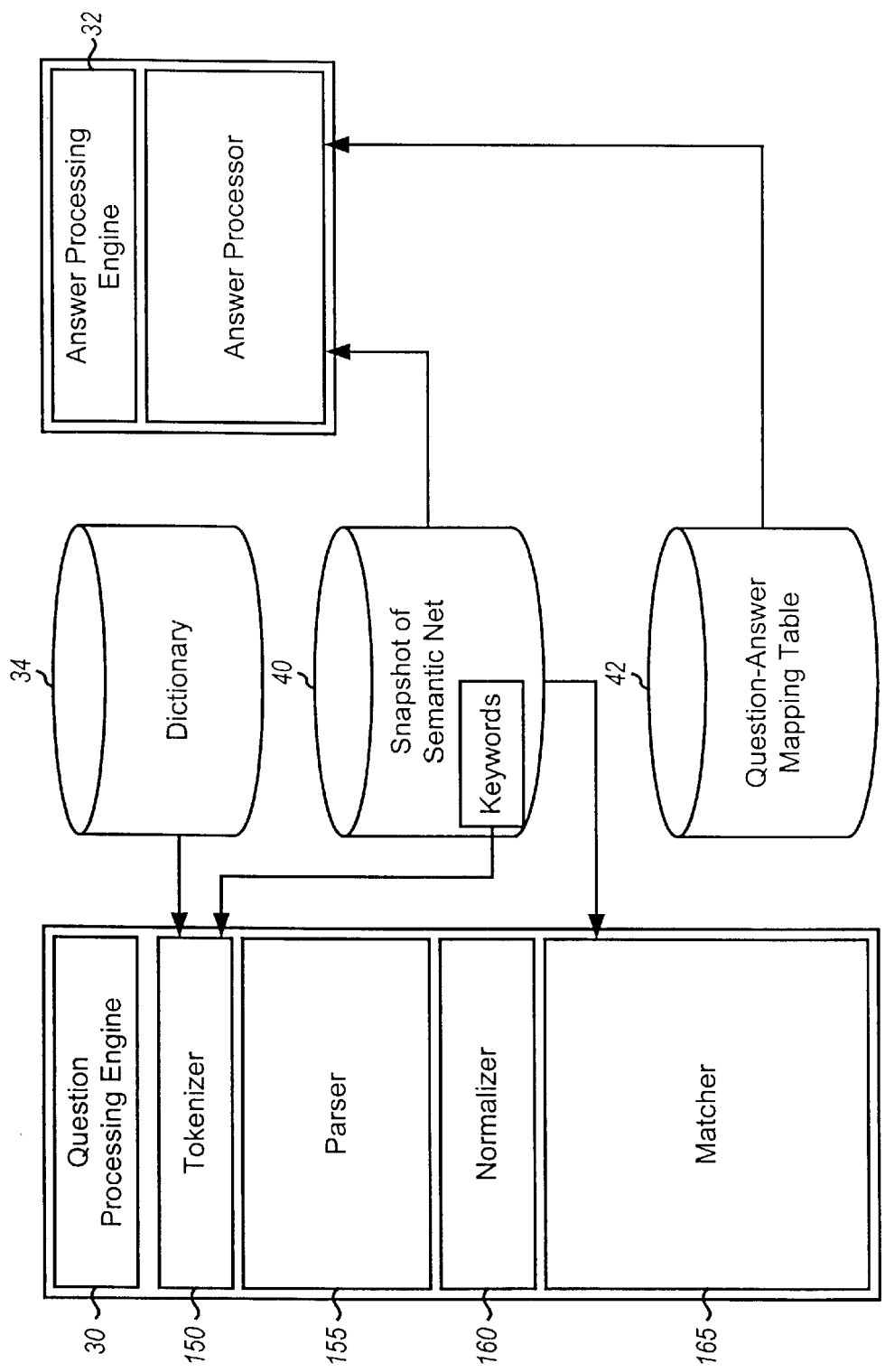
FIG. 5 is a block diagram of the QPE and APE of FIG. 1, shown here in further detail.

Referring now to FIG. 5, a block diagram of QPE 30 and APE 32 is shown with QPE 30 comprising a tokenizer 150, a parser 155, a normalizer 160 and a matcher 165. Tokenizer 150 converts the initial user query into a list of words and provides the list to parser 155. One structure for conversion is an augmented transition network. Another approach to tokenizing is to scan the initial user query and group words into conceptual strings, removing plurals and suffixes. With such an approach, the longest strings can be grouped first, so that they are given greater priority over shorter strings.

Parser 155 identifies the set of possible syntactic structures that could represent the question(s) being asked and passes the structure set to normalizer 160, with each syntactic structure representing one possible syntactic interpretation of the question. Parser 155 can also deal with adverbs and specialized parsers for ambiguous statements. For example, parser 155 might recognize that the questions "Who is the French president" and "Who is the president of France" has the same underlying syntactical structure.

Figure 6:
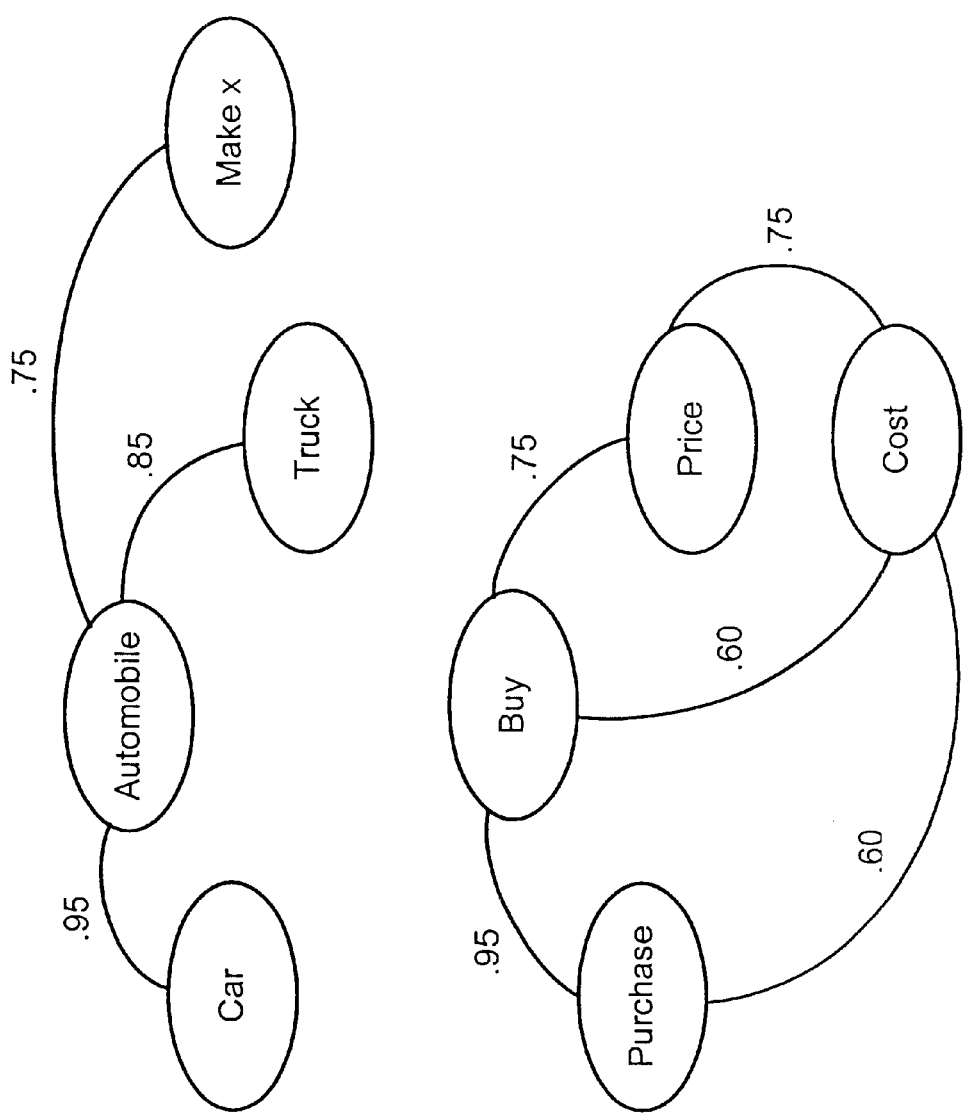
FIG. 6 is a graph of a portion of a semantic net.

Normalizer 160 reforms the syntactic structures into canonical forms by replacing synonyms with a canonical term. Using the canonical terms allows for a much more compact set of questions, since the many synonyms do not need to be handled. For example, a user query might use one of the synonyms "drizzle", "storming" or "misting" for raining. By reducing the synonyms to canonical form, the information server does not need to deal with so many questions because, in the above example, four questions collapse into one. Normalizer 160 uses a semantic map, a small portion of which is shown in FIG. 6, to perform the canonical reduction.

Once normalizer 160 has reduced the structure set to a normalized structure set, normalizer 160 passes the normalized structure set to matcher 165. Matcher 165 then matches the normalized structure set against semantic net snapshot 40. The semantic net is changing as more questions are being asked and the semantic net is being refined, so an information server will often use a snapshot of the state of the semantic net at one point in time. However, either a snapshot or a live copy of the semantic net will work for its purposes in information servers, such as server 10 or server 50. An example of a semantic net is shown in FIGS. 7–8.

By matching the normalized structure set against a semantic net, as described in more detail below in the description of FIGS. 7–8, matcher 165 obtains a list of instantiated questions (template questions with parameter values identified) and provides those to APE 32. Since the list is of instantiated questions that are based on template questions, they will be found in question-answer mapping table 42 and APE 32 obtains the answers that match the questions.

Figure 7:
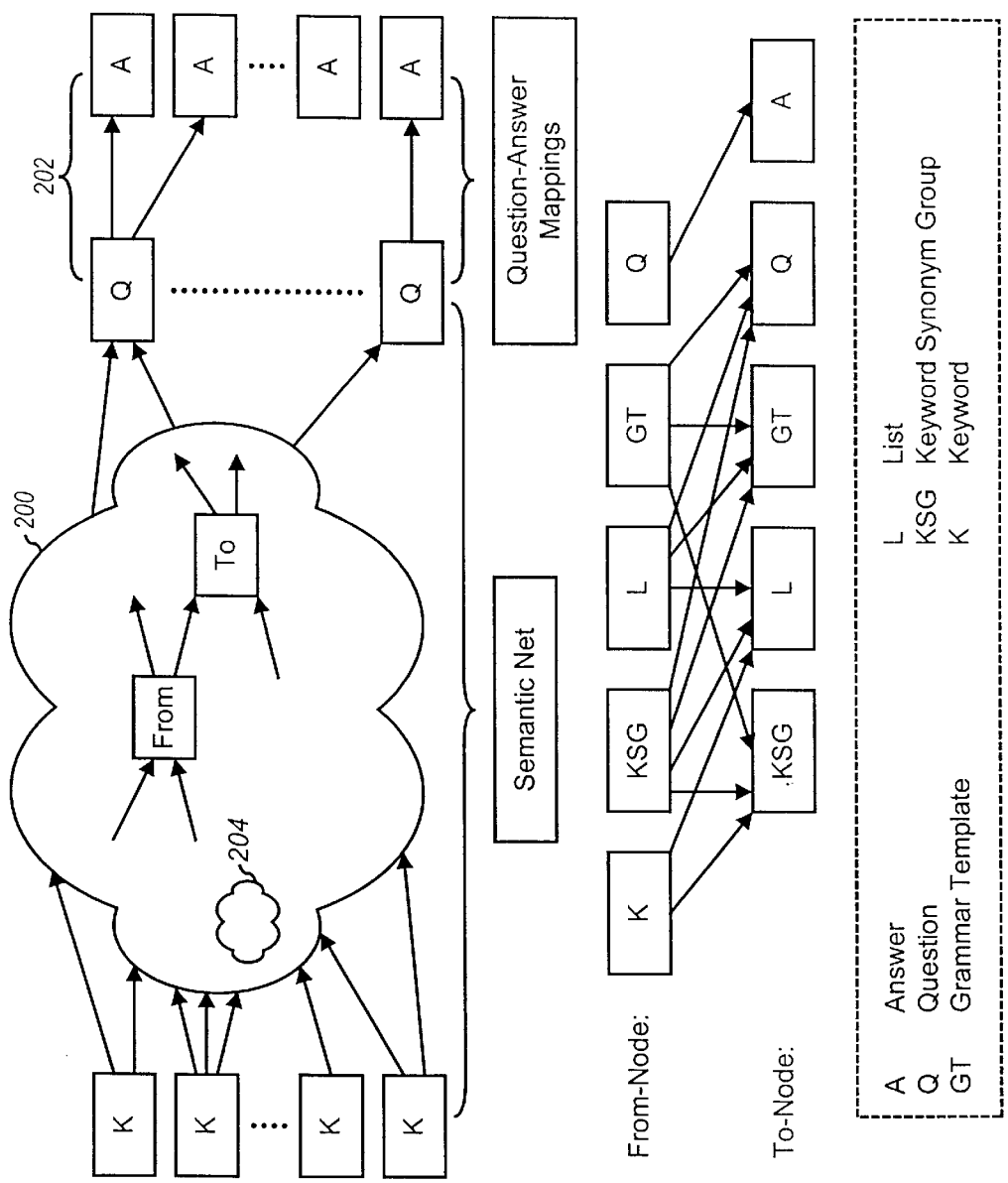
FIG. 7 is an alternate view of a semantic net.
Figure 8:
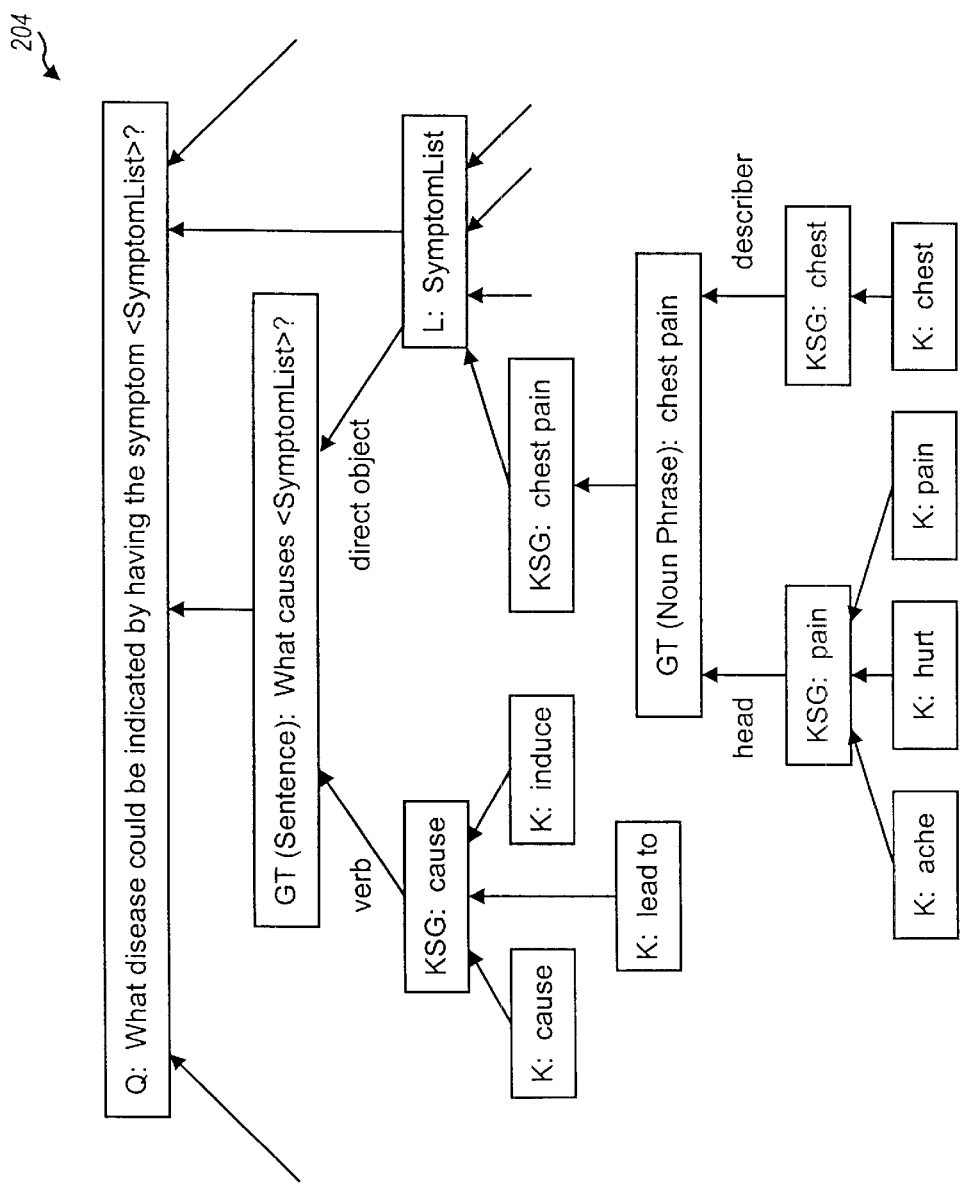
FIG. 8 is a more detailed view of a portion of the semantic net shown in FIG. 7.

FIG. 7 illustrates how a semantic net 200 might be organized to be used to map keywords to questions. Once keywords are mapped to questions, the questions are mapped to answers using question-answer mappings 202. A small portion 204 of semantic net 200 is shown in detail in FIG. 8.

Figure 9:
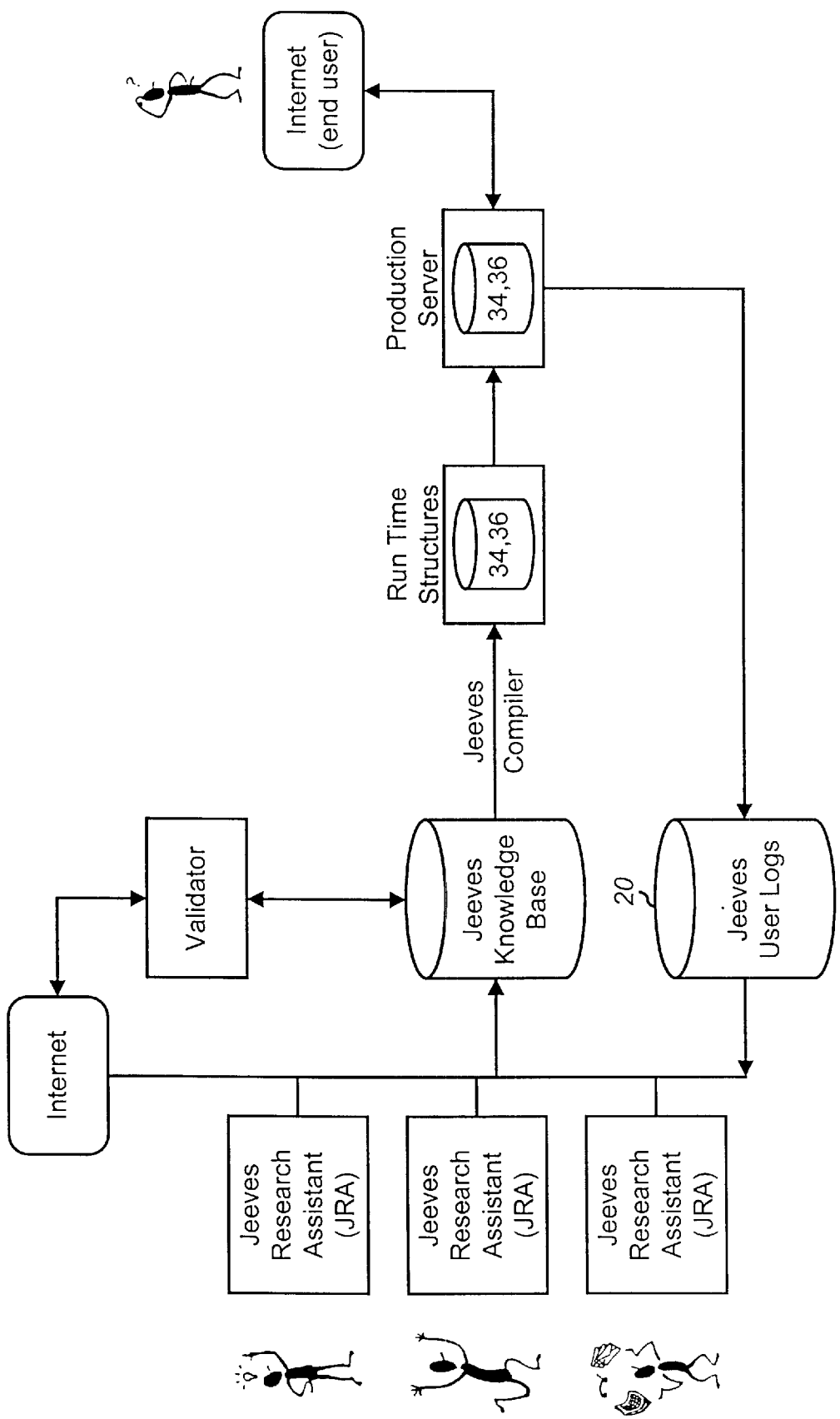
FIG. 9 is a block diagram of a computer system for collecting information and generating run-time structures, such as semantic nets, from the collected information.

FIG. 9 is a block diagram of a computer system for collecting information and generating run-time structures, such as semantic nets, from the collected information.

What is claimed is:

1. An information server for directing users of the information server to desired sources of information where the desired sources of information are determined, at least in part, based on user input, the information server comprising:

query input processor for accepting an initial user query;
 a question database of template questions, wherein a template question is a question in the database that is coupled to at least one answer reference, the answer reference being one of an answer to the template question or a pointer to a possible location of an answer to the template question;
 a question processor that processes the initial user query to identify a set of correlated template questions selected from the question database, wherein the question processor comprises a parser for generating a syntactic structure from the list of words and a normalizer for reducing the syntactic structure to a canonical syntactic structure;
 means for presenting at least some of the set of template questions to the user;
 means for accepting a user selection of a template question if more than one template question is presented; and
 an answer processor which responds to a user selection of a presented template question from the presented set of template questions, wherein the response of the answer processor depends on the at least one answer reference coupled to the user selected question from the presented set of template questions.

2. The information server of claim 1, wherein the user initial query is a text string comprising a sequence of one or more tokens, wherein a token is one or more words that have meaning together and a token is either a natural language question or a keyword string, which is a text string comprising one or more keywords in an order and zero or more logical connectors.

3. The information server of claim 1, wherein the question processor comprises:

a tokenizer for tokenizing the initial user query into a list of words;
 a parser for generating a syntactic structure from the list of words;
 a normalizer for reducing the syntactic structure to a canonical syntactic structure; and
 a matcher for matching the canonical syntactic structure against a semantic network to obtain a weighted list of well-formed questions representative of possible semantic meanings for the initial user query.

4. The information server of claim 3, wherein the matcher comprises:
- a structure mapper;
- a substructure mapper; and
- a keyword mapper.

5. The information server of claim 1, wherein the question processor comprises confidence weighting logic that compares confidence weights for each of the set of correlated template questions selected from the question database and removes template questions from the set that have a confidence weight below a predetermined threshold.

6. The information server of claim 5, wherein the predetermined threshold is a value corresponding to a drop off of confidence weights of template questions in the set.

7. A method for directing users to desired sources of information where the desired sources of information are determined, at least in part, based on user input using a question database of template questions, wherein a template question is a question in the database that is coupled to at least one answer reference, the answer reference being one of an answer to the template question or a pointer to a possible location of an answer to the template question, the method comprising:
- receiving an initial user query;
- processing the initial user query to identify a set of correlated template questions selected from the question database, wherein processing comprises generating a syntactic structure from a list of words and a normalizer for reducing the syntactic structure to a canonical syntactic structure;
- presenting at least some of the set of template questions to the user;
- accepting a user selection of a template question if more than one template question is presented; and
- responding to a user selection of a presented template question from the presented set of template questions, wherein the response depends on the at least one answer reference coupled to the user selected question from the presented set of template questions.

8. The method of claim 7, further comprising:
- tokenizing the initial user query into a list of words;
- generating a syntactic structure from the list of words;
- reducing the syntactic structure to a canonical syntactic structure; and
- matching the canonical syntactic structure against a semantic network to obtain a weighted list of well-formed questions representative of possible semantic meanings for the initial user query.

9. The method of claim 7, further comprising:
- comparing confidence weights for each of the set of correlated template questions selected from the question database; and
- removing template questions from the set that have a confidence weight below a predetermined threshold.

* * * * *